US009906643B2

(12) United States Patent
Kim et al.

(10) Patent No.: US 9,906,643 B2
(45) Date of Patent: Feb. 27, 2018

(54) SYSTEM, APPARATUS AND METHOD OF PROVIDING PHONE CALL ROUTE INFORMATION

(71) Applicant: NAVER CORPORATION, Seongnam-si, Gyeonggi-do (KR)

(72) Inventors: Dong Ki Kim, Seongnam-si (KR); Eun Mi Kim, Seongnam-si (KR); Hyeon Sik Moon, Seongnam-si (KR); Hyeon Su Jeong, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 100 days.

(21) Appl. No.: 14/743,497

(22) Filed: Jun. 18, 2015

(65) Prior Publication Data
US 2016/0127542 A1 May 5, 2016

(30) Foreign Application Priority Data
Nov. 4, 2014 (KR) ........................ 10-2014-0152185

(51) Int. Cl.
H04M 3/42 (2006.01)
H04W 4/16 (2009.01)
H04M 1/725 (2006.01)

(52) U.S. Cl.
CPC ... *H04M 3/42059* (2013.01); *H04M 1/72561* (2013.01); *H04M 1/72597* (2013.01);
(Continued)

(58) Field of Classification Search
CPC ......... H04M 3/42059; H04M 1/72597; H04M 3/42102; H04M 1/72561; H04M 3/42076; H04W 4/16
(Continued)

(56) References Cited

U.S. PATENT DOCUMENTS 7,260,198 B1* 8/2007 Scott ................. H04M 3/42221
379/142.06
8,817,957 B1 8/2014 Tirey et al.
(Continued)

FOREIGN PATENT DOCUMENTS

CN 101702745 A 5/2010
CN 102682397 A 9/2012
(Continued)

OTHER PUBLICATIONS

Japanese Office Action dated Sep. 6, 2016 for corresponding Japanese Patent Application No. 2015-126318.
(Continued)

*Primary Examiner* — Dhaval Patel
(74) *Attorney, Agent, or Firm* — Harness, Dickey & Pierce, P.L.C.

(57) ABSTRACT

Provided is a system, apparatus, and/or method for providing phone call route information, including a calling party information collector configured to collect calling party information according to selecting of a phone number link object provided to a calling party through a network a called party information collector configured to collect called party information about a certain incoming call from a called terminal, and a matching determiner configured to determine a relation between the selecting of the phone number link object and the certain incoming call by comparing at least one piece of the calling party information and at least one piece of the called party information.

18 Claims, 14 Drawing Sheets

(52) U.S. Cl.
CPC ... *H04M 3/42076* (2013.01); *H04M 3/42102* (2013.01); *H04W 4/16* (2013.01)

(58) Field of Classification Search
USPC .......... 455/415, 406, 414.1; 370/352, 395.71
See application file for complete search history.

(56) References Cited

U.S. PATENT DOCUMENTS

| | | | |
|---|---|---|---|
| 9,118,760 B2 * | 8/2015 | Atef | .................. H04L 67/34 |
| 2015/0180981 A1 * | 6/2015 | Tan | .................. H04M 7/003 |
| | | | 709/219 |

FOREIGN PATENT DOCUMENTS

| | | |
|---|---|---|
| JP | H10336346 A | 12/1998 |
| JP | 2002101207 A | 4/2002 |
| JP | 2003274047 A | 9/2003 |
| JP | 2003298724 A | 10/2003 |
| JP | 2004015763 A | 1/2004 |
| JP | 2012513169 A | 6/2012 |
| KR | 2010-0038959 A | 4/2010 |
| KR | 1020130049237 A | 5/2013 |
| KR | 20140152185 | 4/2015 |
| WO | WO-2010080498 A1 | 7/2010 |
| WO | WO-2014025313 A1 | 2/2014 |

OTHER PUBLICATIONS

Korean Office Action dated Aug. 19, 2015 issued in corresponding Korean Application No. 10-2014-0152185.
Japanese Office Action dated May 9, 2017 for corresponding Japanese Patent Application No. 2015-126318.
Taiwanese Office Action dated Jan. 26, 2017 for corresponding Taiwanese Patent Application No. 10620105920.
Chinese Office Action dated Nov. 28, 2017 for corresponding Chinese Application No. 201510307144.6.

* cited by examiner

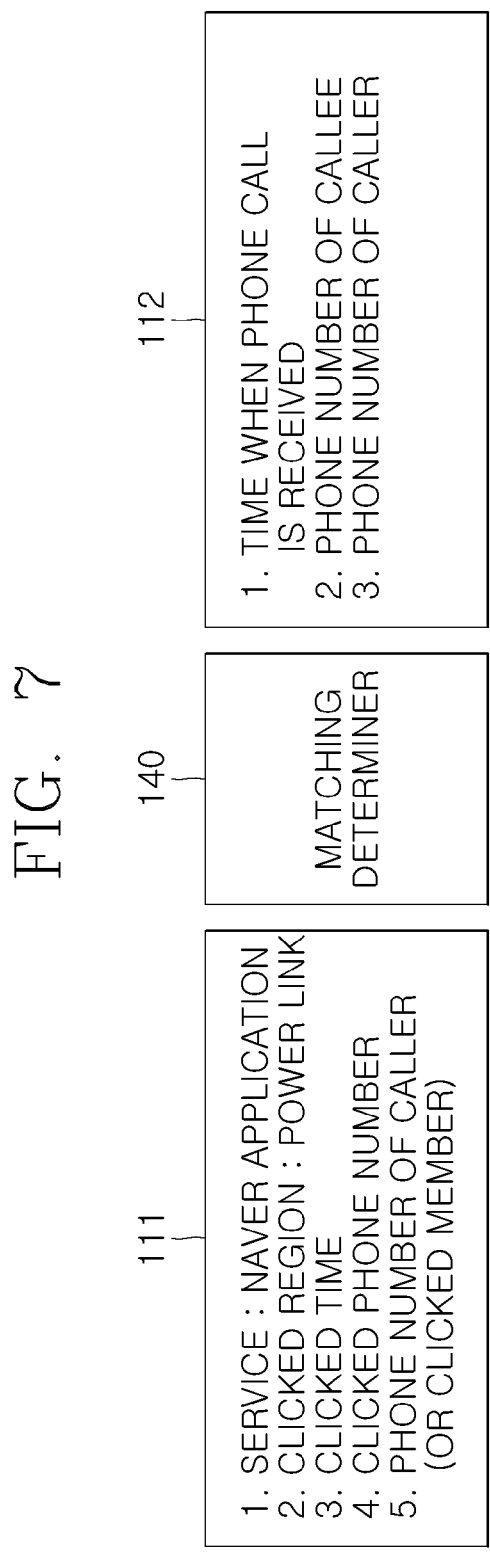

SYSTEM, APPARATUS AND METHOD OF PROVIDING PHONE CALL ROUTE INFORMATION

CROSS-REFERENCE TO RELATED APPLICATION

This application claims priority from and the benefit of Korean Patent Application No. 10-2014-0152185, filed on Nov. 4, 2014, in the Korean Intellectual Property Office, the disclosure of which is incorporated herein in its entirety by reference.

BACKGROUND

1. Field of the Invention

The example embodiments relate to a system, apparatus, and/or method of providing phone call route information, and more particularly, to a system, apparatus and/or method of providing phone call route information, wherein significant information about a caller is provided to a Callee (i.e., the called party) by providing information about how the caller obtained a phone number and/or contact information of the Callee.

2. Description of the Related Art

Recently, the scale of a mobile communication market has rapidly grown, and now, mobile communication has become an essential element for modern people. However, according to the growth of the mobile communication market, drawbacks have appeared, such as personal information and data thefts and leaks, and a related increase in spam calls. Typically, spam calls are more nuisances to people than spam messages or spam emails since spam calls require immediate responses.

Accordingly, some mobile communication users use a caller identification (ID) service so as not to answer a phone call from a caller who is not registered in their contact lists.

However, it may be undesirable to block all phone calls from people who are not in their contact list, and beneficial phone calls instead of promotional phone calls may also be blocked and/or disregarded.

SUMMARY

One or more example embodiments may include a system, apparatus and/or method of providing phone call route information that notifies a Callee about how a caller obtained the phone number, contact information, or the like (hereinafter inclusively referred to as "phone number" for the sake of brevity) of the Callee.

One or more example embodiments may include a system, apparatus and/or method of providing phone call route information that provides information about which advertising medium consumers saw to get through advertisers so as to help the advertisers to choose an advertising medium.

One or more example embodiments may include a system, apparatus and/or method of providing phone call route information that collects or predicts phone call route information and displays the collected or predicted information on a called terminal, by using suitable network resources with respect to various circumstances, such as when a caller calls a Callee by selecting a phone number link object suggested through an application or a web page of a mobile communication terminal, and when a phone call is automatically made to a Callee as a caller terminal is remotely controlled through an application installed on a terminal of a caller, such as a personal computer (PC).

One or more example embodiments include a system, apparatus, and/or method of providing phone call route information, which collect or predict phone call route information and display the collected or predicted information on a called terminal through information related to selecting of a phone number link object of a caller, even if a phone number of the caller is untraceable.

According to one or more example embodiments, a system for providing phone call route information may include a server including a memory having computer readable instructions stored thereon, and at least one processor configured to execute the computer readable instructions to, collect calling party information according to selecting of a phone number link object provided to a calling party through a network, collect called party information about a certain incoming call from a called terminal, determine a relation between the selecting of the phone number link object and the certain incoming call by comparing at least one piece of the calling party information and at least one piece of the called party information.

According to various example embodiments, the phone number link object may be displayed on a caller terminal via a webpage through the network or a user interface (UI) screen of an application.

According to various example embodiments, the phone number link object may be displayed on a screen of a first terminal of the calling party, and a phone call is made as a second terminal of the calling party is driven according to the selecting of the phone number link object.

According to various example embodiments, the calling party information may include at least one of service details of providing the phone number link object, information about a time when the phone number link object is selected, a phone number linked to the phone number link object, information about a member who selected the phone number link object, a phone number of a caller terminal, and information about a time when an outgoing call is made according to the selecting of the phone number link object, information about a search keyword for providing the phone number link object, and information about service details of providing the phone number link object displayed on a webpage or a UI screen of an application.

According to various example embodiments, the called party information may be collected from an application installed on the called terminal, and may comprise at least one of information about a time when the certain incoming call is received, a phone number of the called terminal, and a phone number of a caller terminal.

According to various example embodiments, the determining may include comparing information about a time when the phone number link object is selected by the calling party to information about a time when the certain incoming call is received by the called party.

According to various example embodiments, the determining may include comparing information about a time when an outgoing call is made according to the selecting of the phone number link object by the calling party to information about a time when the certain incoming call is received by the called party.

According to various example embodiments, the determining may include comparing a phone number linked to the phone number link object associated with the calling party to a phone number of the called terminal associated with the called party.

According to various example embodiments, the determining may include comparing a phone number of a caller terminal to a phone number of a caller terminal.

According to various example embodiments, the determining may include comparing information about a user who selected the phone number link object to a phone number of a caller terminal.

According to various example embodiments, the determining may include determining similarity between pieces of information collectable based on a phone number included in the calling party information and the called party information.

According to various example embodiments, the processor may be configured to execute the computer readable instructions to transmit at least one piece of the calling party information based on a result of the determining of the relation such that the at least one piece of the calling party information is displayed on the called terminal.

According to various example embodiments, the at least one piece of the calling party information displayed on the called terminal may comprise at least one of service details of providing the phone number link object, information about a time when the phone number link object is selected, a phone number linked to the phone number link object, information about a member who selected the phone number link object, a phone number of a caller terminal, and information about a search keyword for providing the phone number link object.

According to various example embodiments, the at least one piece of the calling party information displayed on the called terminal is provided through an advance notice screen before the certain incoming call is displayed or through a follow-up notification screen after the certain incoming call is displayed.

According to one or more example embodiments, a method of providing, by a server, phone call route information may include collecting calling party information according to selecting of a phone number link object provided to a caller terminal through a network, collecting called party information about a certain incoming call from a called terminal, and determining a relation between the selecting of the phone number link object and the certain incoming call by comparing at least one piece of the calling party information and at least one piece of the called party information. The method may also include transmitting at least one piece of the calling party information based on a result of the determining of the relation such that the at least one piece of the calling party information is displayed on the called terminal.

According to one or more example embodiments, a non-transitory computer-readable medium including computer readable instructions, which when executed by a processor, configures the processor to collect called party information about a certain incoming call, transmit the called party information to a server configured to collect calling party information according to selecting of a phone number link object provided to a caller terminal through a network, receive at least one piece of the calling party information from the server based on a result of determining a relation between the selecting of the phone number link object and the certain incoming call by comparing at least one piece of the calling party information and at least one piece of the called party information, and display the received at least one piece of the calling party information on a called terminal.

According to one or more example embodiments, a method of providing phone call route information may include receiving, by a called terminal, at least one piece of calling party information from a server as a certain incoming call is received, and displaying, on a screen of the called terminal, the received at least one piece of the calling party information, wherein the calling party information includes at least one of information about a search keyword for providing a phone number link object selected by a calling party and information about service details of providing the phone number link object on a webpage or a user interface (UI) screen of an application.

According to one or more example embodiments, a method of generating phone call route information may include collecting, by a calling terminal, at least one piece of calling party information, transmitting, by the calling terminal, the collected calling party information to a server, and initiating, by the calling terminal, a call to a called party, wherein the calling party information includes at least one of service details of providing a phone number link object selected by a calling party, information about a time when the phone number link object is selected, a phone number linked to the phone number link object, information about a member who selected the phone number link object, a phone number of a caller terminal, and information about a time when an outgoing call is made according to the selecting of the phone number link object.

According to one or more example embodiments, a non-transitory computer-readable medium including computer readable instructions for executing a method of providing phone call route information that may include receiving, by a called terminal, at least one piece of calling party information from a server as a certain incoming call is received, and displaying, on a screen of the called terminal, the received at least one piece of the calling party information, wherein the calling party information includes at least one of information about a search keyword for providing a phone number link object selected by a calling party and information about service details of providing the phone number link object on a webpage or a user interface (UI) screen of an application.

According to one or more example embodiments, a non-transitory computer-readable medium including computer readable instructions for executing a method of providing phone call route information may include receiving, by a called terminal, at least one piece of calling party information from a server as a certain incoming call is received, and displaying, on a screen of the called terminal, the received at least one piece of the calling party information, wherein the calling party information includes at least one of service details of providing a phone number link object selected by a calling party, information about a time when the phone number link object is selected, a phone number linked to the phone number link object, information about a member who selected the phone number link object, a phone number of a caller terminal, and information about a time when an outgoing call is made according to the selecting of the phone number link object.

According to at least one example embodiment, an apparatus for receiving communication route information may include a display panel, a memory having computer readable instructions stored thereon, and at least one processor configured to execute the computer readable instructions to, receive information associated with a contacting party from a server as a communication is received, and display the received contacting party information on the display panel, the received contacting party information includes information related to a link object selected by the contacting party at the time when the communication was initiated by the contacting party.

The apparatus may also include the contacting party information includes information about a search keyword used by the contacting party to obtain the contacted party's contact information.

The apparatus may also include the received communication includes at least one of a phone call, a video call, a text message, an email, an instant message, a chat session, and a social media post.

According to at least one example embodiment, an apparatus for transmitting communication route information, the apparatus may include a display panel, a memory having computer readable instructions stored thereon, and at least one processor configured to execute the computer readable instructions to, display on the display panel at least one link object, the link object associated with a party to be contacted, collect information associated with a user of the apparatus, transmit information associated with the user to a server, and establish a communication session between the user and the contacted party

BRIEF DESCRIPTION OF THE DRAWINGS

The foregoing and other features of the example embodiments will be apparent from the more particular description of non-limiting embodiments, as illustrated in the accompanying drawings in which like reference characters refer to like parts throughout the different views. The drawings are not necessarily to scale, emphasis instead being placed upon illustrating principles of inventive concepts. In the drawings:

FIG. 7 is a diagram for describing a matching method for tracking a caller, according to an example embodiment.

DETAILED DESCRIPTION

Figure 1:
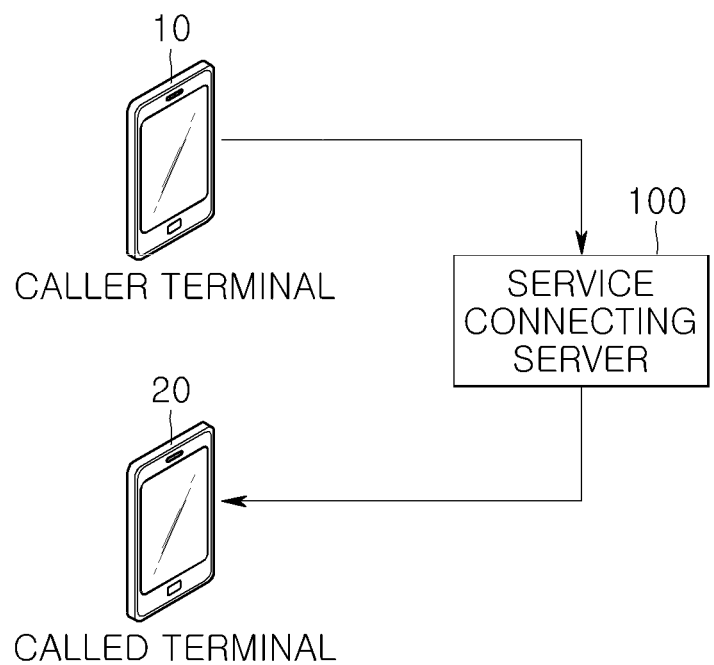
FIG. 1 is a diagram schematically illustrating a system for providing phone call route information, according to an example embodiment.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of the example embodiments to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described with reference to the accompanying drawings.

FIG. 1 is a diagram schematically illustrating a system for providing phone call (or other types of communication, such as video calls, text messages, email, instant messaging, chat sessions, social media posts, or the like—hereinafter inclusively referred to as a "phone call" for the sake of brevity) route information, according to at least one example embodiment. Referring to FIG. 1, the system may include a caller terminal 10, a called terminal 20, and a service connecting server 100.

The caller terminal 10 and the called terminal 20 may be terminals for transmitting and receiving voice or data to and from each other. For example, the caller terminal 10 and the called terminal 20 may each be a mobile phone, a smart phone, a telephone, a tablet personal computer (PC), a PC, a personal digital assistant (PDA), or any other electronic device capable of making a voice phone call, video phone call, chat session, or the like. Here, the called terminal 20 may be a terminal including a display screen for displaying information wirelessly or via wires.

An outgoing switch (not shown) and an incoming switch (not shown) of a communication network, such as a mobile communication network, may set and/or establish a call (e.g., a connection) for a voice signal transmitted from and received by the caller terminal and the called terminal 20, and may process voice data transmission and reception between the caller terminal 10 and the called terminal 20.

When the caller terminal 10 (or the called terminal 20) is a mobile communication terminal and a communication network connecting the caller terminal 10 (or the called terminal 20) and the outgoing switch (or the incoming switch) is a mobile communication network, a base station (not shown) and a base station controller (not shown) may be further disposed between the caller terminal 10 (or the called terminal 20) and the outgoing switch (or the incoming switch).

The phone call route information according to at least one example embodiment denotes various types of information and/or details of how a caller input a phone number, or other communication establishing identifier (e.g., an extension number, screen name, email address, or the like), of a Callee to the caller terminal 10. For example, the phone call route information may be information indicating "member who searched for [flower delivery] via a search engine mobile application, such as Mobile Power Link, a search advertisement of Naver application" when the caller tries to make a phone call by selecting a phone number link object 11a of FIG. 4 provided to a calling party through a network.

Figure 4:
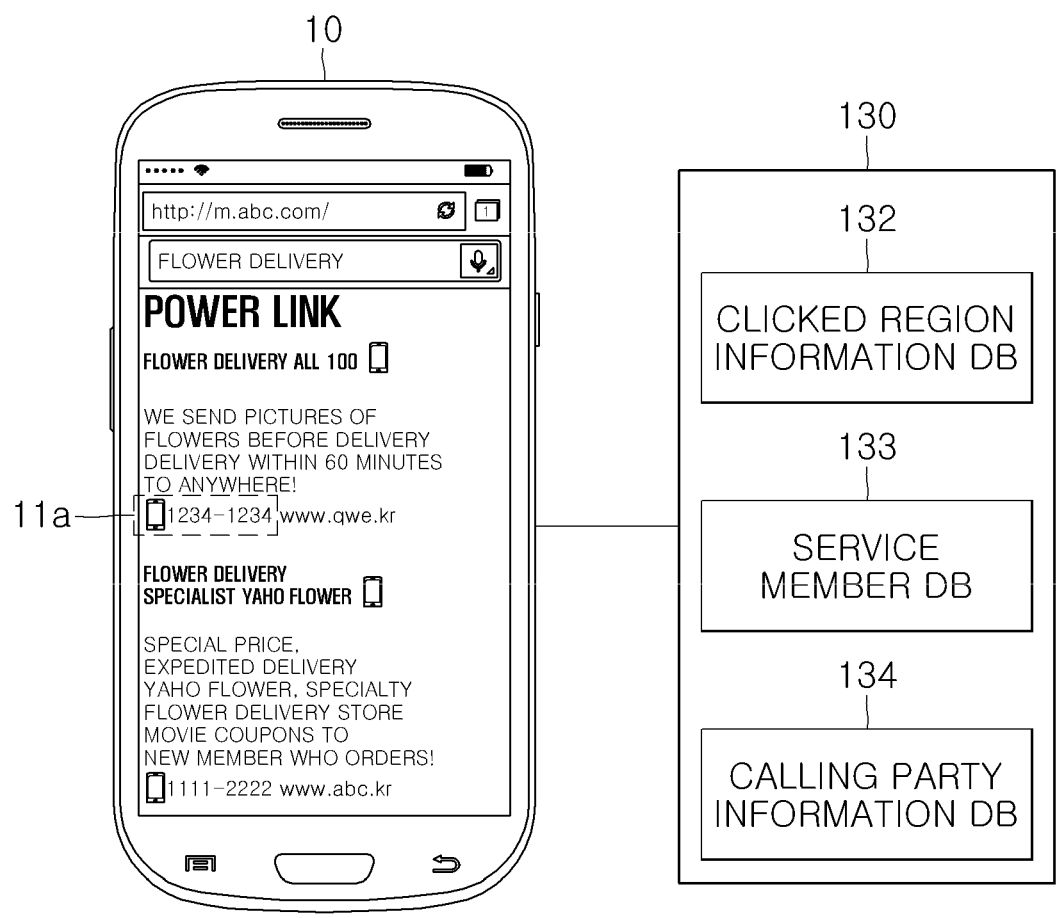
FIG. 4 is a diagram for describing collecting of calling party information from a caller terminal, according to an example embodiment.

In addition, for example, the phone call route information may include various types of information about the details of how the phone number of the Callee is input, such as information indicating 'input from network' when the caller tries to make a phone call by selecting the phone number link object 11a of FIG. 4 provided to the calling party through the network, information indicating 'direct dial' when the caller tries to make a phone call by directly dialing the caller terminal 10, or information indicating 'connected via quick response (QR) code' when the caller tries to make a phone call by scanning a QR code by using the caller terminal 10.

The phone call route information may include some of the calling party's information that will be described later, or may be processed according to the calling party information. The system according to an example embodiment may display the phone call route information on the called terminal 20.

Figure 2:
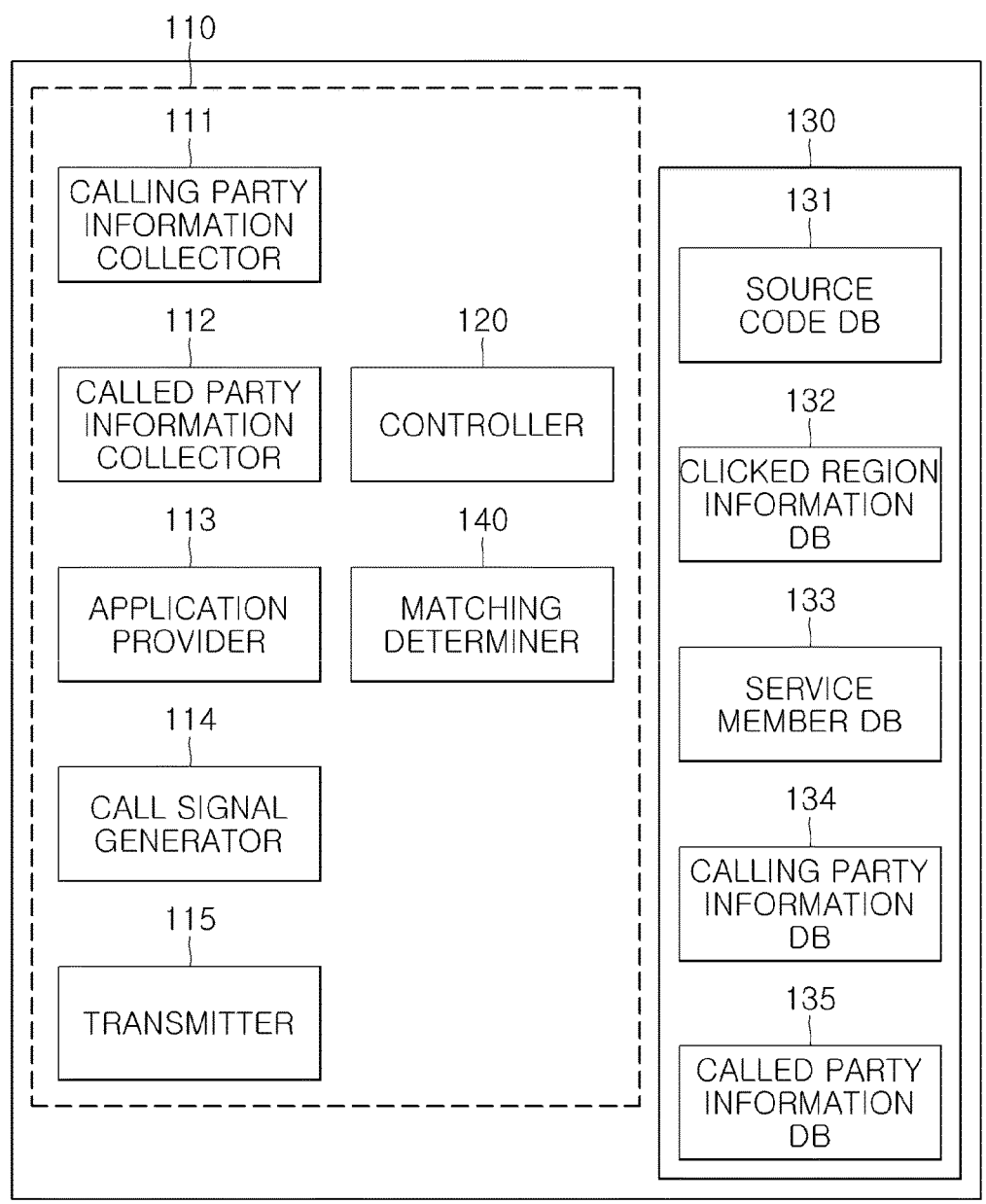
FIG. 2 is a block diagram of a service connecting server of the system of FIG. 1 according to an example embodiment.

FIG. 2 is a block diagram of the service connecting server 100 of the system of FIG. 1. Referring to FIG. 2, the service connecting server 100 may include may include at least one processor 110, a bus (not shown), a network interface (not shown), a memory (not shown), and at least one storage device 130 that may store one or more databases, such as databases 131-135.

The server 100 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). The databases may also be stored in memory, and/or may be stored on a separate computing device (not shown) accessible via the network interface.

The memory may include an operating system (OS) and a service providing routine. The processor 110 be configured to process computer readable instructions of, for example, a computer program by performing a basic arithmetic and logic operation, and an input/output (I/O) operation of the service connecting server system 100, thereby transforming the processor 110 into a special purpose processor. The computer readable instructions may be stored on memory. The processor 110 may be configured to execute the computer readable instructions as one or more program modules, such as the calling party information collector 111, the called party information collector 112, the application provider 113, the call signal generator 114, the transmitter 115, the controller 120, and/or the matching determiner 140. According to other example embodiments, the service connecting server 100 may include a number of constituent elements more or less than the number of constituent elements of FIG. 2.

The memory may include a permanent mass storage device, such as a random access memory (RAM), a real only memory (ROM), and a disc drive, as a computer-readable storage medium. Also, program modules for the OS and the service providing routine, and the like, may be stored in the memory. Such software constituent elements may be loaded from another computer-readable storage medium separate from the memory using a drive mechanism (not shown). The other computer-readable storage medium may include, for example, a floppy drive, a disc, a tape, a DVD/CD-ROM drive, and a memory card. Software constituent elements may be loaded to the memory through a network interface instead of using the computer-readable storage medium.

A bus enables communication and data transmission between the constituent elements of the service connecting server 100. The bus may be configured using a high-speed serial bus, a parallel bus, a storage area network (SAN), and/or another appropriate communication technology.

A network interface may be a computer hardware constituent element for connecting the service connecting server 100 to a mobile communication network, data network and/or computer network. The network interface may connect to a network through a wireless or wired connection.

Figure 10:
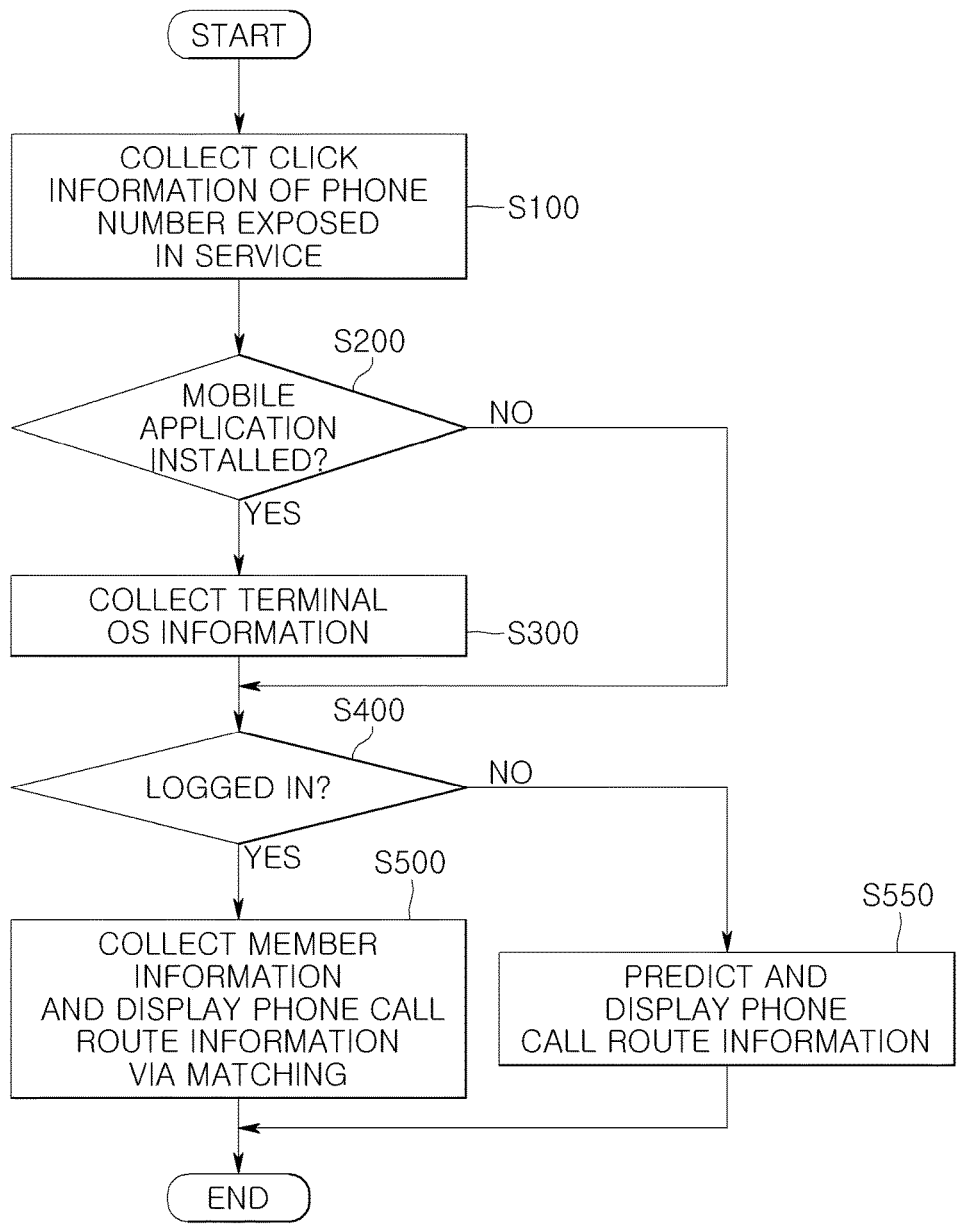
FIG. 10 is a flowchart of a method of providing phone call route information, according to an example embodiment.
Figure 11:
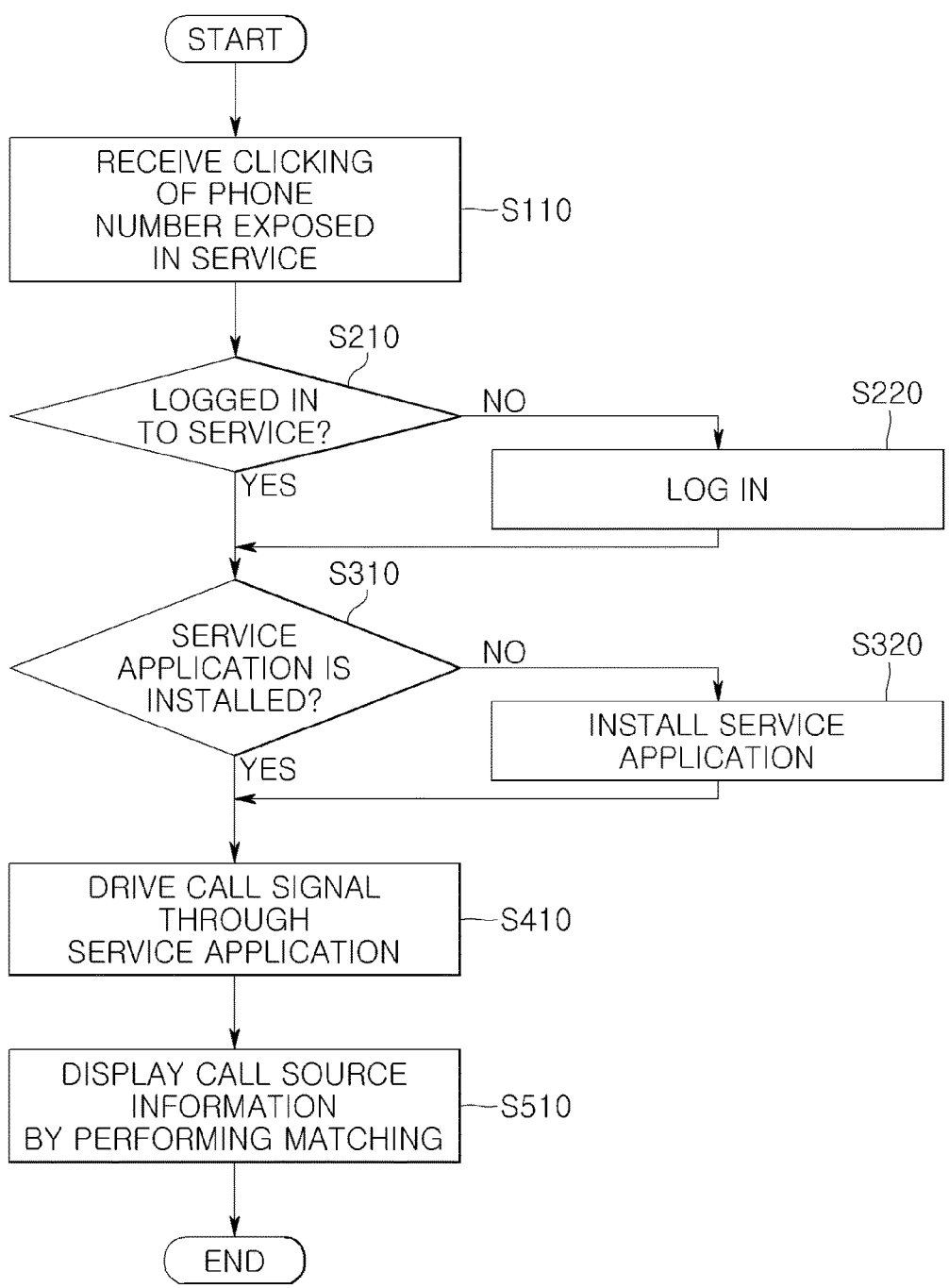
FIG. 11 is a flowchart of a method of providing phone call route information, according to another example embodiment.

When executed by a processor, such as the processor 110, the computer readable instructions associated with the calling party information collector 111, the called party information collector 112, the application provider 113, the call signal generator 114, the transmitter 115, the controller 120, and/or the matching determiner 140 may specially configure the processor to perform operations S100 to S550 of FIG. 10 and/or perform operations S110 to S510 of FIG. 11.

The system according to an example embodiment provides the phone call route information about how the caller terminal 10 obtained the phone number of the Callee to the called terminal 20 so as to provide information relating to the phone call to both the caller and the Callee.

Accordingly, the Callee learns the phone call route information together with a phone number of the caller, which are provided to the called terminal 20, and thus if the Callee is a business, a governmental office, a public organization (e.g., a hospital, a legal clinic, a non-profit organization, etc.), etc., the Callee may determine how a new customer/client/patient flowed in, and if the Callee is an ordinary person, the Callee may determine whether a phone call to the called terminal 20 is a spam/nuisance/undesired call or an informative/beneficial/desired call.

Also, since the phone call route information may be displayed on the called terminal 20, a phone call connection probability may be increased even if the phone number of the caller is not on a contact list stored in the called terminal 20 and/or the caller information is not recognized by the Callee.

The calling party information collector 111 may be configured to collect calling party information according to the selection of a phone number link object, such as an embedded link on a webpage, supplied through a mobile application, or provided by a search engine, with the phone number information included in the link, provided to a calling party through a network. The calling party information may include at least one of service details of providing the phone number link object, information about a time when the phone number link object is selected, a phone number linked to the phone number link object, information about a user and/or member who selected the phone number link object, a phone number of the caller terminal 10, and information about the time when an outgoing call is made according to the selection of the phone number link object.

When the caller selects the phone number link object via a mobile webpage, mobile application, or a search engine, the calling party information collector 111 may extract a search keyword input to the mobile webpage, mobile application, or the search engine. For example, when the caller inputs 'flower delivery' as a search keyword to the mobile webpage and selects a certain phone number link object from a result window to make a phone call, the calling party information collector 111 may extract 'flower delivery' as the search keyword.

The calling party information collector 111 may collect at least one of the service details of providing the phone number link object, the information about the time when the phone number link object is selected, the phone number linked to the phone number link object, the information about the member who selected the phone number link object, the phone number of the caller terminal 10, and the information about the time when the outgoing call is made according to the selecting of the phone number link object.

Also, the calling party information collector 111 may collect information about the search keyword for providing the phone number link object. The information about the search keyword may include information about which search keyword exposed the phone number of the Callee.

Accordingly, the Callee may determine which search keyword the caller used to call the Callee, thereby determining a search keyword effective for advertisement.

The called party information collector 112 collects information about a certain incoming call from the called terminal 20, and the application provider 113 generates an application providing the phone call route information according to an example embodiment and may provide the application to at least the caller terminal 10 and the called terminal 20.

The called party information may be collected from the application installed on the called terminal 20, and may include at least one of information about a time when the certain incoming call is received, the phone number of the called terminal 20, and the phone number of the caller terminal 10.

The called party information collector 112 may collect a time when a phone call is received by the called terminal 20, the phone number of the Callee, and the phone number of the caller.

The application according to an example embodiment may be configured to display the phone call route information, and may collect the phone number of the caller, which is provided by an operating system (OS) of the caller terminal 10.

According to an example embodiment, calling party information provided by an OS of a terminal is collected, but additionally and/or alternatively, if calling party information cannot be collected through an OS of a terminal, the calling party information may be collected through a telecommunication company, internet service provider, software installed on the terminal, or the like.

The call signal generator 114 may be configured to generate a signal enabling the caller terminal 10 to make a phone call to the called terminal 20. When the caller clicks a phone number link object through a third terminal, such as a PC, the call signal generator 114 may transmit a call signal to the caller terminal 10 to make a phone call, as will be described in detail later with reference to FIG. 9.

The transmitter 115 may transmit at least one piece of the calling party information to the called terminal 20 to be displayed according to determination of a relation by the matching determiner 140.

The controller 120 may be configured to perform controls and processes related to operations of the service connecting server 100.

The database (DB) 130 may include a source code DB 131, a clicked region information DB 132, a service member DB 133, a calling party information DB 134, and a called party information DB 135.

The source code DB 131 may store a source code. A source code is coded information matching a general type of phone call route information, i.e., the source code may provide information regarding the phone call and/or route information. For example, a source code may be '0001' when phone call route information is 'phone call via mobile webpage' and may be '0002' when phone call route information is 'phone call via contact list'.

The clicked region information DB 132 may store information about a clicked region, information about a clicked time, information about a clicked phone number, and information about a clicked keyword.

The service member DB 133 may include information provided while subscribing to a caller identification (ID) service. For example, a gender, an age group, and a residence of a subscriber may be provided, and thus the service member DB 133 may store statistics data on a plurality of callers who input a search keyword.

The calling party information DB 134 stores information about the phone number of the caller terminal 10 at a point of time when the caller selects the phone number link object 11a of FIG. 4 displayed on the caller terminal 10, a time when a phone call is made, and a time when a phone call is ended.

The phone number link object 11a may be displayed on the caller terminal 10 via a webpage through a network or a user interface (UI) screen of an application. Additionally, the phone number link object 11a may be displayed on a screen of a first terminal of a calling party, and a phone call may be made when a second terminal of the calling party is driven according to selecting of the phone number link object 11a. Here, the first terminal may be a PC and the second terminal may be a smart phone, but the first and second terminals are not limited thereto.

The called party information DB 135 may collect and store called party information from the called terminal 20. The called party information may be collected from an application installed on the called terminal 20, and may include at least one of information about a time when an incoming call is received, the phone number of the called terminal 20, and the phone number of the caller terminal 10.

The matching determiner 140 may track the caller by matching the calling party information and the called party information, as will be described in detail later with reference to FIG. 7.

Figure 3:
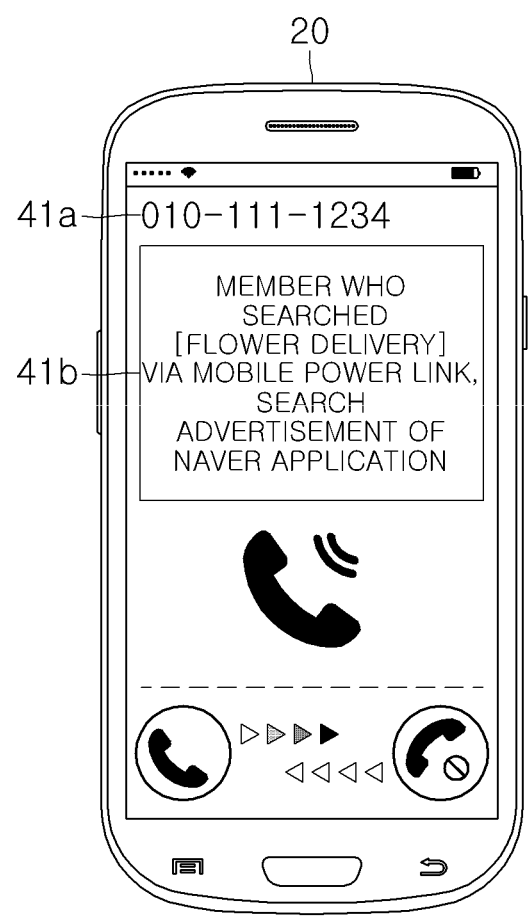
FIG. 3 is a diagram showing an example of an incoming call screen displayed on a called terminal, according to an example embodiment.

FIG. 3 is a diagram showing an example of an incoming call screen displayed on the called terminal 20, according to an example embodiment. FIG. 3 illustrates the incoming call screen of the called terminal 20.

A phone number 41a of a caller and a phone call route 41b are displayed on the incoming call screen of the called terminal 20. Accordingly, the Callee may look at the incoming call screen to learn the phone call route 41b, i.e., how the caller corresponding to the phone number 41a obtained the phone number of the Callee, such as determining whether the caller obtained the Callee's contact information through the Callee's website, through a mobile application, through a search engine, through a social media service, through an advertising medium, or the like.

FIG. 4 is a diagram for describing collecting of calling party information from the caller terminal 10, according to an example embodiment. Referring to FIG. 4, when a caller executes a call (or other relevant communication/messaging) function by selecting the phone number link object 11a displayed on the caller terminal 10, a caller application installed on the caller terminal 10 detects the execution of the call function and extracts call information.

Also, a time when the phone number link object 11a is selected, a search keyword, a location of the phone number link object 11a, and information provided by the caller to subscribe to an application may be collected by the calling party information collector 111, and stored in the clicked region information DB 132, the service member DB 133, and the calling party information DB 134.

Figure 5:
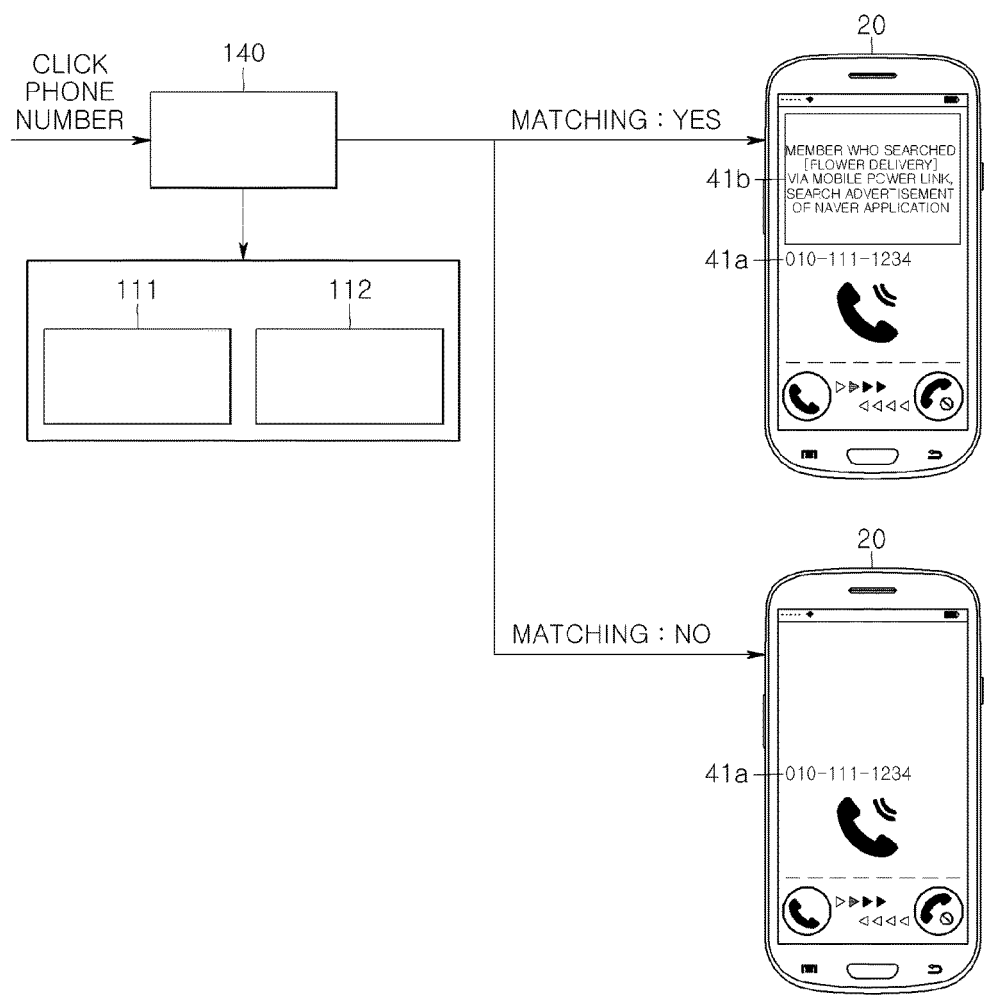
FIG. 5 is a diagram for describing a method of displaying a phone call route on a called terminal, according to an example embodiment.

FIG. 5 is a diagram for describing a method of displaying a phone call route on the called terminal 20, according to an example embodiment. Referring to FIG. 5, when a caller selects the phone number link object 11a displayed on the caller terminal 10, the matching determiner 140 may be configured to track the caller by matching the calling party information collected by the calling party information collector 111 and called party information collected by the called party information collector 112. If the calling party information and the called party information match each other, the phone number 41a and the phone call route 41b may be displayed on an incoming call screen of the called terminal 20, and if not, only the phone number 41a may be displayed on an incoming call screen of the called terminal 20. Additionally, caller identification information obtained from other sources, such as a telecommunication company's caller-ID service, a personal information database, a social media service, or the like, may be displayed on the incoming call screen as well.

Figure 6A:
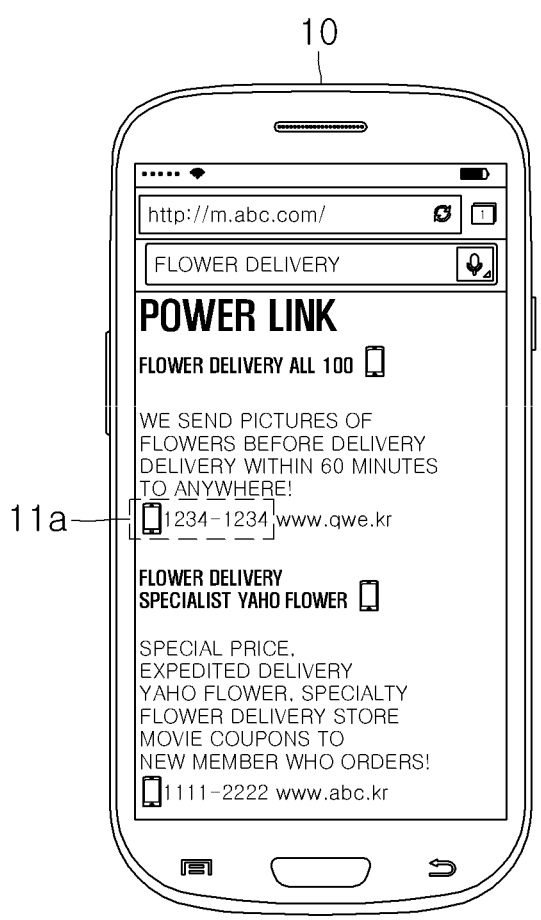
FIGS. 6A through 6C are diagrams for describing a process of connecting a phone call, according to an example embodiment.
Figure 6B:
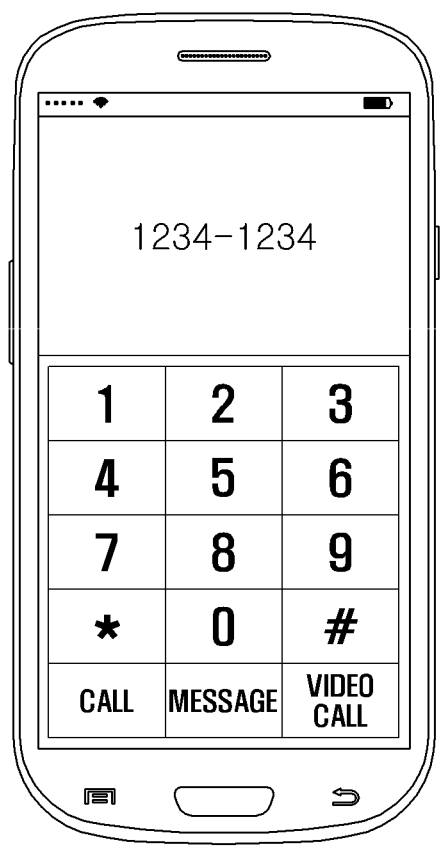
Figure 6C:

FIGS. 6A through 6C are diagrams for describing a process of connecting a phone call, according to at least one example embodiment. As shown in FIG. 6A, when the phone number link object 11a is selected, a phone call is not immediately made, but a phone number linked to the phone number link object 11a is displayed on a phone number input window of the caller terminal 10 as shown in FIG. 6B, and the phone call is made as a call button is input as shown in FIG. 6C. In this case, for example, a caller may be tracked by referring to a difference between a time when the phone number link object 11a is selected and a time when the phone call is received by the called terminal 20, which is collected by the called party information collector 112.

Here, the matching determiner 140 may determine whether a time when the phone number (or email address, social media contact, instant messaging user name, chat application user name, etc.) is clicked (e.g., the time when the phone number link object 11a is selected), which is collected by the calling party information collector 111, and the time when the phone call (or email, social media post, instant message, chat, text, etc.) is received by the called terminal 20, which is collected by the called party information collector 112, match each other because, except for unusual cases, it is rare that there is a long temporal gap between selecting of a phone number link object and inputting of a call button. For example, a suitable time interval may be set to determine the matching by adjusting a variable of matching determination algorithm, such as several seconds.

FIG. 7 is a diagram for describing a matching method for tracking a caller, according to an example embodiment. The matching method uses calling party information stored in the calling party information DB 134 and called party information stored in the called party information DB 135, wherein the matching determiner 140 may determine whether the calling party information and the called party information match each other.

The matching determiner 140 may determine a relation between selecting of a phone number link object and an incoming call by comparing information about a time when the phone number link object is selected, which is included in the calling party information, and information about a time when the incoming call is received, which is included in the called party information.

Additionally, the matching determiner 140 may determine the relation by comparing information about a time when an outgoing call is made according to the selecting of the phone number link object, which is included in the calling party information, and the information about the time when the incoming call is received, which is included in the called party information, by comparing a phone number linked to the phone number link object, which is included in the calling party information, and the phone number of the called terminal 20, which is included in the called party information, by comparing the phone number of the caller terminal 10, which is included in the calling party information, and the phone number of the caller terminal 20, which is included in the called party information, or by comparing information about a user and/or member who selected the phone number link object, which is included in the calling party information, and the phone number of the caller terminal 20, which is included in the called party information.

In detail, when the caller selects the phone number link object 11a displayed on the caller terminal 10, a phone number linked to the phone number link object 11a is copied to a phone number input window of the caller terminal 10. Then, when the caller selects a call button, the calling party information is transmitted to the called terminal 20.

The calling party information transmitted to the called terminal 20 may include at least one of a type of a service used by the caller, a region clicked and selected by the caller, a selected time, a selected phone number, and a phone number of the caller (or a selected application subscriber).

In addition to above examples, various types of information collectable based on a phone number (or other contact information type) included in the calling party information and the called party information may be used to increase accuracy of the matching.

For example, the accuracy of the matching may be increased by collecting not only a phone number of a calling party when the calling party clicks a phone number link object, but also non-identification personal information collectable online, such as location information and a serial number of a terminal, determining a method of collecting location information based on a base station of a telecommunication company through a phone number of a caller when a phone call is received by a called party and various types of information collectable online, and determining similarity between information collected by the calling party and information collected by the called party.

Examples of the type of the service include various search sites, applications for providing information, and websites, and in addition, may include a mobile webpage of or related to a Callee (such as a social media account, personal website, business website, or the like), which contains a phone number or other contact information for the Callee. Additionally, the service may be an informational brochure, advertisement leaflet, or the like, that may include a QR code (or the like), and here, when a phone call is made as a caller scans the QR code included in the advertisement leaflet, the calling party information may include information about a location where the advertisement leaflet is distributed or a person who distributed the advertisement leaflet.

Information about the region clicked and selected by the caller may include information about a search keyword, wherein the information about the search keyword includes information about which search keyword is used to expose a phone number of a Callee.

Accordingly, the Callee is able to learn which search keyword is used by the caller to make a phone call to the called terminal 20, and thus the Callee may determine a search keyword effective for an advertisement.

The transmitter 115 may be configured to transmit at least one piece of the calling party information or phone call route information processed according to the calling party information to the called terminal 20 to be displayed, based on a result of the matching.

The at least one piece of the calling party information displayed on the called terminal 20 may include at least one of service details of providing a phone number link object, information about a time when the phone number link object is selected, a phone number linked to the phone number link object, information about a member who selected the phone number link object, the phone number of the caller terminal 10, and a keyword for providing the phone number link object.

Even if a phone number of a caller is not collected from the calling party information collector 111, the called terminal 20 detects that a phone call is received when the caller selects the phone number link object 11a displayed on the caller terminal 10, and the matching determiner 140 determines whether information regarding the phone call matches information stored in the called party information DB 135.

The phone number of the caller is not collected if the caller terminal 10 does not provide the phone number of the caller, i.e., if the phone number of the caller is not determined via an application.

Figure 8A:
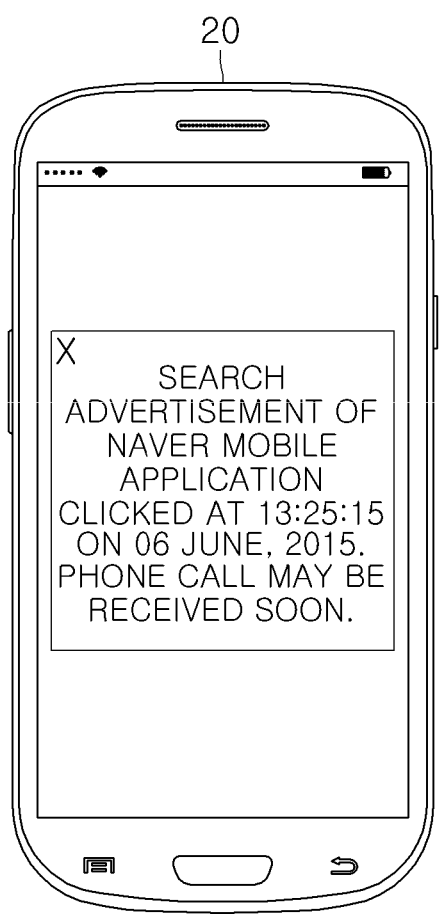
FIGS. 8A and 8B are diagrams respectively illustrating an advance notice screen and a follow-up notification screen, according to an example embodiment.

When it is determined that calling party information and called party information match each other before a phone call is made according to selecting of a phone number link object, an advance notice screen including a phone call route and a time may be displayed on an incoming call screen of the called terminal 20 as shown in FIG. 8A.

Figure 8B:
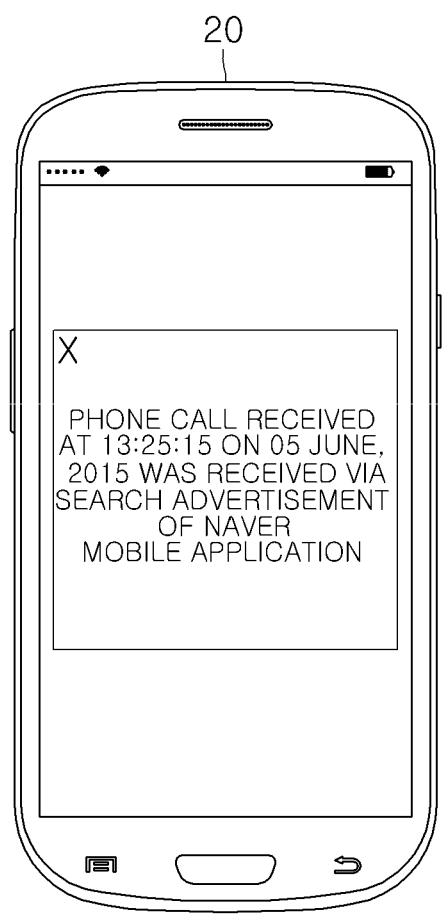

When it is difficult to determine whether calling party information and called party information match each other when a phone call is made, a follow-up notification screen including a phone call route and a time may be displayed on the called terminal 20 as shown in FIG. 8B, by determining whether the calling party information and the called party information match each other after the phone call is ended.

Figure 9:
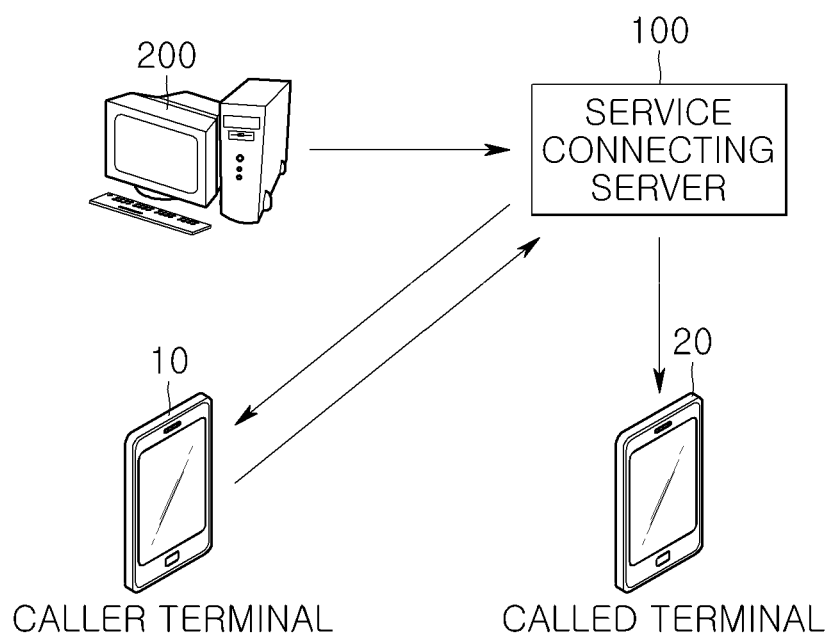
FIG. 9 is a diagram schematically illustrating a system for providing phone call route information, according to another example embodiment.

FIG. 9 is a diagram schematically illustrating a system for providing phone call route information, according to another example embodiment. Referring to FIG. 9, companies related to a search keyword may be provided through a first terminal 200 that may be a PC or the like, via power links, business websites, maps, search engine services, social media services, applications, or the like.

Also, in order to encourage a caller to log in to a service or to install an application, the terminal 200 may request that the caller log in to an application providing a caller ID service or whether the application is installed on the caller terminal 10, when the caller clicks a phone number of a certain company through the terminal 200. Then, an application providing a phone call route display service may make a phone call to the certain company. Accordingly, the service connecting server 100 receives a call signal from the terminal 200, and the call signal generator 114 remotely controls the caller terminal 10 such that the caller terminal 10 makes a phone call to the called terminal 20.

When the caller is tracked through the terminal 200, information about a service area where a phone number link object that is clicked is displayed (for example, information of a clicked service area, information about a search keyword for providing a search result, information about a phone number of a Callee, and other collectable information), and information about a service member (for example, information provided to subscribe to a service) may be used, similarly to when the caller is tracked through the caller terminal 10, since such information is collectable by a web or application service provider.

Meanwhile, when the caller is tracked through the caller terminal 10, information provided by the OS of the caller terminal 10, such as a phone number to which a phone call is made by clicking a phone number link object, a status of the phone call, a time when the phone call is made, and a time when the phone call is ended, may be further used.

FIG. 10 is a flowchart of a method of providing phone call route information, according to an example embodiment. In detail, according to the method of FIG. 10, a phone number link object is selected by using the caller terminal 10, and in operation S100, information is collected upon selecting (clicking) of the phone number link object exposed on a service screen.

A phone number may be clicked when, for example, a caller selects the phone number link object from a screen of a terminal, which is provided by inputting a search keyword.

At this time, the collected information may include at least one of the clicked phone number, a clicked time, information about a clicked region, and information about the search keyword.

Then, it is determined whether a mobile application is installed in operation S200, and if the mobile application is installed, terminal OS information is collected in operation S300. The terminal OS information is information agreed to be provided by the caller while installing the mobile application, and may include at least one of a phone number of the caller, a time when a phone call is made, the duration of the phone call, and a time when the phone call is ended.

Then, it is determined whether the caller logged in to an application providing call information service in operation S400, and when the caller is logged in, member information (for example, a phone number registered while subscribing to the application providing call information service) is collected and phone call route information is displayed to a called party by performing matching based on such member information, in operation S500.

When the caller is not logged in to the application providing call information service, it may be difficult to use the member information, and thus phone call route information may be predicted and displayed in operation S550 by performing predicting and matching based on collectable information.

The member information may include the phone number registered while subscribing to the application providing call information service or other usable information. The member information may include location information of the caller if the caller agreed to provide the location information.

FIG. 11 is a flowchart of a method of providing phone call route information, according to another example embodiment. In detail, according to the method of FIG. 11, a caller terminal tries to make a phone call when a phone number link object is selected through a PC, wherein clicking of the phone number link object exposed in a service is received in operation S110, i.e., the phone number link object exposed on a screen of the PC is selected.

Then, it is determined whether a caller is logged in to the service in operation S210, and when the caller is not logged in, the caller is induced to log in to the service in operation S220. Then, it is determined whether an application providing the service is installed in operation S310, and when the application is not installed, the caller is induced to install the application in operation S320.

Then, a call signal through the application is driven in operation S410. The application is installed on the caller terminal, and the call signal is driven to a phone number linked to the phone number link object exposed on the screen of the PC through the application installed on the caller terminal associated with the PC when the caller selects the phone number link object.

Then, call source information is displayed by performing matching, in operation S510. Since the caller logged in to the service and installed the applications in operation S210 and S310, terminal OS information and member information are collectable. Thus, the call source information is displayable by performing the matching.

According to at least one example embodiment, useful information about a phone call route may be provided to a Callee by notifying the Callee how a caller obtained a phone number of the Callee.

Also, according to at least one example embodiment, information about how a caller obtained contact information about the Callee, such as which advertising medium consumers saw to get through advertisers, may be provided so as to help the advertisers to choose an advertising medium.

Also, according to at least one example embodiment, phone call route information may be collected and predicted and the collected or predicted information may be displayed on a called terminal, by using suitable network resources with respect to various circumstances, such as when a caller calls a Callee by selecting a phone number link object suggested through an application or a web page of a mobile communication terminal and when a phone call is automatically made to a Callee as a caller terminal is remotely controlled through an application installed on a terminal of a caller, such as a personal computer (PC).

Also, according to at least one example embodiment, phone call route information may be predicted and displayed on a called terminal through information related to selecting of a phone number link object of a caller, even if a phone number of the caller is untraceable.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device(s) may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, and/or computer storage medium or device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A system for providing phone call route information, the system comprising:
    a server including a memory having computer readable instructions stored thereon, and at least one processor configured to execute the computer readable instructions to,
        collect calling party information according to selecting of a phone number link object provided to a calling party through a network, the collected calling party information including information related to how the phone number link object was obtained by the calling party, the information related to how the phone number link object was obtained by the calling party including at least one of: information related to a search keyword used by the calling party to obtain the phone number link object, and service detail information related to a webpage or a UI screen of an application that the phone number link object was displayed on,
        collect called party information about a certain incoming call from a called terminal,
        determine a relation between the selecting of the phone number link object and the certain incoming call by comparing at least one piece of the calling party information and at least one piece of the called party information, and
        transmit the collected calling party information based on a result of the determining of the relation such that the collected calling party information is displayed on the called terminal.

2. The system of claim 1, wherein the phone number link object is displayed on a caller terminal via a webpage through the network or a user interface (UI) screen of an application.

3. The system of claim 1, wherein
    the phone number link object is displayed on a screen of
        a first terminal of the calling party, and
        a phone call is made as a second terminal of the calling party is driven according to the selecting of the phone number link object.

4. The system of claim 1, wherein the calling party information comprises at least one of:
    service details of providing the phone number link object;
    information about a time when the phone number link object is selected;
    a phone number linked to the phone number link object;
    information about a member who selected the phone number link object;
    a phone number of a caller terminal; and
    information about a time when an outgoing call is made according to the selecting of the phone number link object.

5. The system of claim 1, wherein the called party information is collected from an application installed on the called terminal, and comprises at least one of:
    information about a time when the certain incoming call is received;
    a phone number of the called terminal; and
    a phone number of a caller terminal.

6. The system of claim 1, wherein the determining includes comparing information about a time when the phone number link object is selected by the calling party to information about a time when the certain incoming call is received by the called party.

7. The system of claim 1, wherein the determining includes comparing information about a time when an outgoing call is made according to the selecting of the phone number link object by the calling party to information about a time when the certain incoming call is received by the called party.

8. The system of claim 1, wherein the determining includes comparing a phone number linked to the phone number link object associated with the calling party to a phone number of the called terminal associated with the called party.

9. The system of claim 1, wherein the determining includes comparing a phone number of a caller terminal to a phone number of a caller terminal.

10. The system of claim 1, wherein the determining includes comparing information about a user who selected the phone number link object to a phone number of a caller terminal.

11. The system of claim 1, wherein the determining includes determining similarity between pieces of information collectable based on a phone number included in the calling party information and the called party information.

12. The system of claim 1, wherein the calling party information displayed on the called terminal further includes at least one of:
service details of providing the phone number link object;
information about a time when the phone number link object is selected;
a phone number linked to the phone number link object;
information about a member who selected the phone number link object;
a phone number of a caller terminal; and
information about a search keyword for providing the phone number link object.

13. The system of claim 1, wherein the calling party information displayed on the called terminal is provided through an advance notice screen before the certain incoming call is displayed or through a follow-up notification screen after the certain incoming call is displayed.

14. A method of providing, by a server, phone call route information, the method comprising:
collecting calling party information according to selecting of a phone number link object provided to a caller terminal through a network, the collected calling party information including information related to how the phone number link object was obtained by the calling party, the information related to how the phone number link object was obtained by the calling party including at least one of: information related to a search keyword used by the calling party to obtain the phone number link object, and service detail information related to a webpage or a UI screen of an application that the phone number link object was displayed on;
collecting called party information about a certain incoming call from a called terminal;
determining a relation between the selecting of the phone number link object and the certain incoming call by comparing at least one piece of the calling party information and at least one piece of the called party information; and
transmitting the collected calling party information based on a result of the determining of the relation such that the collected calling party information is displayed on the called terminal.

15. The method of claim 14, further comprising:
transmitting the calling party information based on a result of the determining of the relation such that the calling party information is displayed on the called terminal.

16. A non-transitory computer-readable medium including computer readable instructions, which when executed by at least one processor, configures the at least one processor to:
collect called party information about an incoming call;
transmit the called party information to a server configured to collect calling party information according to selecting of a phone number link object provided to a caller terminal through a network, the collected calling party information including information related to how the phone number link object was obtained by the calling party, the information related to how the phone number link object was obtained by the calling party including at least one of: information related to a search keyword used by the calling party to obtain the phone number link object, and service detail information related to a webpage or a UI screen of an application that the phone number link object was displayed on;
receive the calling party information from the server based on a result of determining a relation between the selecting of the phone number link object and the incoming call by comparing at least one piece of the calling party information and the called party information; and
display the received calling party information on a called terminal.

17. An apparatus for receiving communication route information, the apparatus comprising:
a display panel;
a memory having computer readable instructions stored thereon; and
at least one processor configured to execute the computer readable instructions to,
receive information associated with a contacting party from a server as a communication is received; and
display the received contacting party information on the display panel,
wherein the received contacting party information includes information related to a link object selected by the contacting party at a time when the communication was initiated by the contacting party and information related to how the link object was obtained by the contacting party, the information related to how the link object was obtained by the contacting party including at least one of: information related to a search keyword used by the contacting party to obtain the link object, and service detail information related to a webpage or a UI screen of an application that the link object was displayed on.

18. An apparatus for transmitting communication route information, the apparatus comprising:
a display panel;
a memory having computer readable instructions stored thereon; and
at least one processor configured to execute the computer readable instructions to,
display on the display panel at least one link object, the link object associated with a party to be contacted;
collect information associated with a user of the apparatus, the collected information including information related to how the link object was obtained by the user, the information related to how the link object was obtained by the user including at least one of: information related to a search keyword used by the user to obtain the link object, and service detail information related to a webpage or a UI screen of an application that the link object was displayed on;
transmit information associated with the user to a server, the transmitted information including the collected information; and
establish a communication session between the user and the contacted party, the communication session including transmitting the transmitted information to the contacted party.

* * * * *